United States Patent [19]
Cunha

[11] 3,973,615
[45] Aug. 10, 1976

[54] APPARATUS FOR SEATING THE BEADS ON TUBELESS TIRES

[76] Inventor: Joseph J. Cunha, 24555 Palomares Road, Castro Valley, Calif. 94546

[22] Filed: Jan. 31, 1975

[21] Appl. No.: 546,002

[52] U.S. Cl. ............................................. 157/1.21
[51] Int. Cl.² ........................................ B60C 25/12
[58] Field of Search ............ 157/1.1, 1.21; 269/130, 269/132

[56] References Cited
UNITED STATES PATENTS

| | | | |
|---|---|---|---|
| 2,871,929 | 2/1959 | Butler et al. | 157/1.21 |
| 2,968,343 | 1/1961 | McConkie | 157/1.21 |
| 3,285,490 | 11/1966 | Roper | 269/130 |
| 3,422,875 | 1/1969 | Robinson | 157/1.21 |

*Primary Examiner*—Al Lawrence Smith
*Assistant Examiner*—James G. Smith
*Attorney, Agent, or Firm*—Naylor, Neal & Uilkema

[57] ABSTRACT

An apparatus comprised of an upright framework having a pair of jaws mounted therein between which a tire may be rolled. One of the jaws is adjustably mounted so that the jaws may accommodate tires of different diameters and the other of the jaws is mounted for compression by an air bag to provide for compression of a tire received between the jaws. In the preferred embodiment, two or more pairs of such jaws are provided so that the apparatus may handle more than one tire at a time.

9 Claims, 5 Drawing Figures

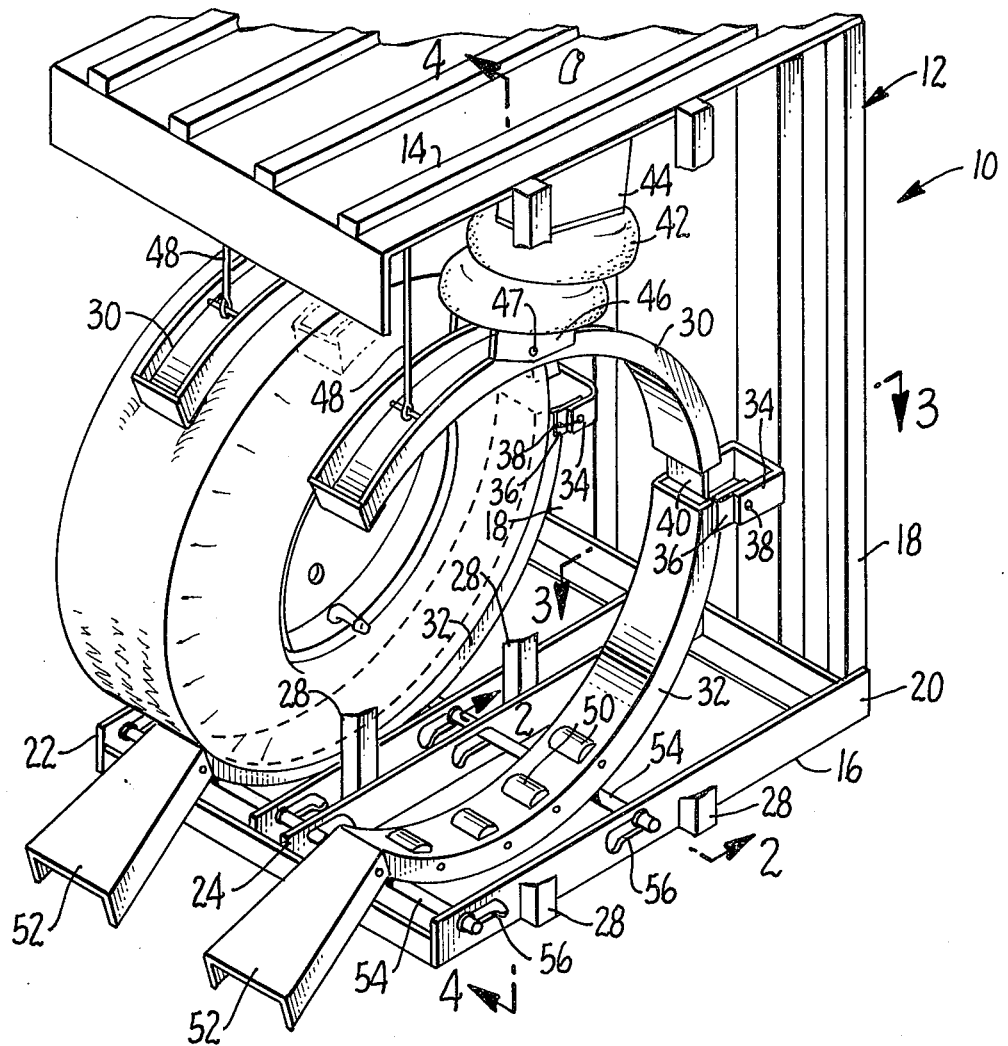
FIG. 1.
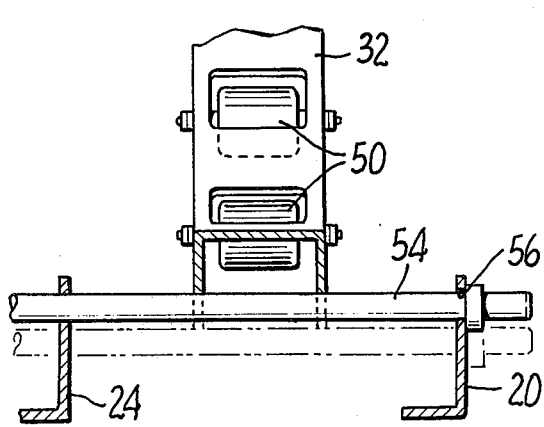
FIG. 2.
FIG. 3.

3,973,615

APPARATUS FOR SEATING THE BEADS ON TUBELESS TIRES

BACKGROUND OF THE INVENTION

The present invention relates to a tire squeezer for tubeless tires to facilitate seating of the beads of the tires during initial inflation. The invention is particularly concerned with such a squeezer wherein a tire may be rolled into place within the squeezer within the necessity of manual lifting.

The prior art relating to the field of the present invention experienced most of its development during that period in the middle-1950's when tubeless tires first became popular. Some of the earliest efforts simply employed a band which was wrapped around the tire and these efforts are exemplified by U.S. Pat. Nos. 2,815,804; 2,818,913; and, 2,968,343. Other efforts employ individual clamping shoes which engage the tire on diametrically opposed sides and these efforts are exemplified by U.S. Pat. Nos. 2,712,850 and 3,422,875. A more recent effort employs a means for blowing air around the periphery of the bead of the tire and this effort is exemplified by U.S. Pat. No. 3,677,320.

The prior art is typified by the requirement that the tires being processed be lifted into place and by the limitation that only one tire can be handled at a time. Much of the prior art, and particularly the old band-type clamps, were additionally typified by the requirement that the band be wrapped around the tire being processed, clamped, and ultimately released.

Other disadvantages of the prior art devices are that they are not readily adaptable to the handling of tires of different diameters and provide no means whereby a tire being processed may be readily rotated to position the valve stem of the tire at a convenient location.

SUMMARY OF THE INVENTION

The basic apparatus of the present invention comprises upper and lower jaws mounted within a framework for movement toward and away from one another. The jaws are vertically aligned and conformed for engagement with the periphery of a tire received therebetween, and the forward edges of the jaws define a mouth through which a tire may be rolled into the space between the jaws. At least one of the jaws is mounted for movement toward and away from the other between an expanded condition wherein a tire may be rolled between the jaws and a compressed condition wherein the jaws clampingly engage the periphery of a tire received therebetween. Compression imparting means are provided to selectively move the jaws toward one another to forcibly engage the jaws with the tire and means is provided to maintain a tire received between the jaws in an upright position.

A principal object of the present invention is to provide an apparatus for seating the beads on tubeless tires wherein the tires may be conveniently positioned and rotated with a minimum of physical effort.

Yet another and more specific object of the invention is to provide such an apparatus wherein a tire may be positioned without the necessity of physically lifting it into place.

Still another object of the invention is to provide such an apparatus which is capable of simultaneously seating the beads on a plurality of tires.

A further object of the invention is to provide such an apparatus which is capable of being adjusted to accommodate tires of different diameters.

Another object of the invention is to provide such an apparatus wherein a simple air bag is used for purposes of compressing the bead of a tire and a simple leaf spring is employed to move the clamping jaws of the apparatus to a tire disengaging position.

BRIEF DESCRIPTION OF THE DRAWINGS

The foregoing and other objects of the invention will become more apparent when viewed in light of the following detailed description and the accompanying drawings wherein:

FIG. 1 is a perspective view of the apparatus of the invention, with parts thereof broken away and a tire shown in place within one pair of the clamping jaws of the apparatus;

FIGS. 2 and 3 are sectional views taken on the planes designated by lines 2—2 and 3—3, respectively, of FIG. 1;

DESCRIPTION OF THE ILLUSTRATED EMBODIMENT

Figure 4:
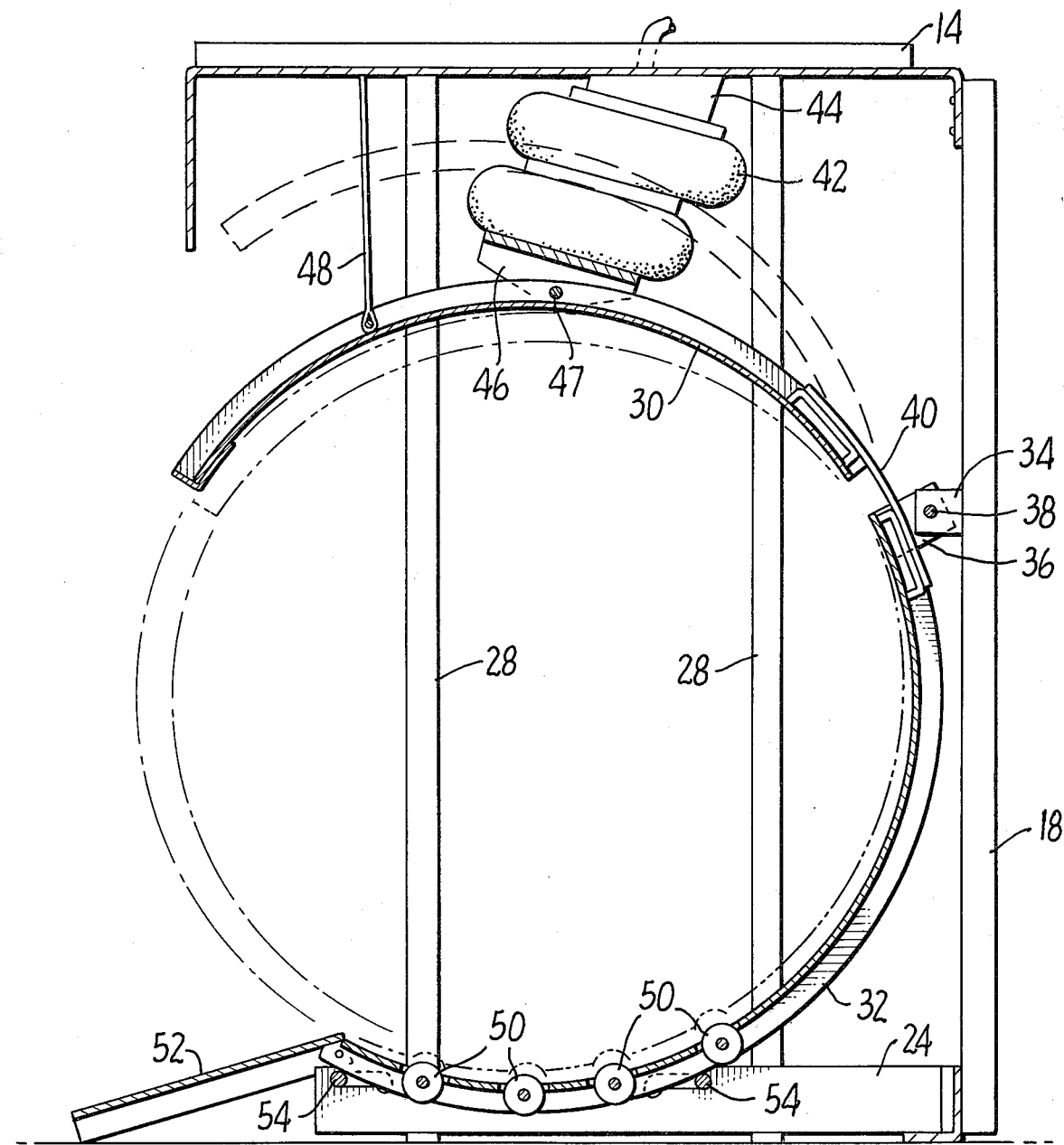
FIG. 4 is a sectional view taken on the plane designated by line 4—4 of FIG. 1, with phantom lines showing the different positions to which the jaws illustrated therein may be moved; and, FIG. 5 is a sectional view similar to FIG. 4, but with parts thereof broken away and the lower jaw adjusted to a position raised relative to that illustrated in solid lines in FIG. 4.

Referring now to FIG. 1, the bead seating apparatus is designated therein in its entirety by the numeral 10 and is shown as having a framework, designated 12. The framework comprises top and bottom members 14 and 16, respectively, rigidly interconnected by a back member 18. Each of the members 14, 16 and 18 is comprised of structural steel elements rigidly interconnected by welds or the like. The elements of the bottom 16 comprise angle-shaped side elements 20 and 22 and a centrally disposed U-shaped element 24. Side members 28 extend upwardly from the side elements 20 and 22 and the centrally disposed U-shaped element 24 to fixed engagement with the top member 14. As will become more apparent from the subsequent discussion, the side members 28 function to divide the framework into two compartments and to maintain tires received within these compartments in an upright position.

Each of the compartments within the framework 14 has mounted therein vertically aligned upper and lower jaws 30 and 32, respectively. The lower jaws are pivotally secured to the back member 18 through means of a bracket 34 fixed to the back member and an extension 36 fixed to the jaw and joined to the bracket 34 by a hinge pin 38. Each upper jaw 30 is secured to the lower jaw aligned therewith through means of a leaf spring 40 fixed to and extending between the respective jaws. Leaf springs 40 are deflectable to provide for movement of the upper jaws relative to the lower jaws between compressed and retracted positions, as shown by the phantom line illustrations in FIG. 4.

An air bag 42, only one of which is illustrated, is mounted between the top member 14 and each of the upper jaws 30. The upper end of each bag carries a pedestal 44 fixed to the top member 14 and the lower end of each bag carries a pedestal 46 pivotally secured to the jaw therebeneath by a pin 47. A flexible strap 48 is secured between each of the upper jaws 30 and the top member 14 to limit downward movement of the jaws.

The lower jaws 32 each carry a plurality of rollers 50 disposed to extend above the inner periphery of the jaws for rollable engagement with a tire supported thereon. Each lower jaw 30 also carries a ramp 52 pivotally secured to and extending outwardly from its forward extremity. The ramps, as will become more apparent from the subsequent discussion, are designed to extend between the forward extremities of the lower jaws and a surface on which the framework 12 is supported to facilitate the rolling of a tire into the space between the aligned upper and lower jaws.

Figure 5:
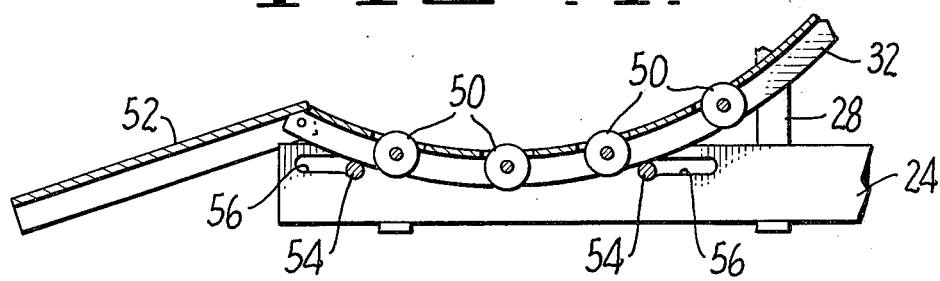

Each lower jaw 32 is supported upon a pair of adjustable stop rods 54. The rods 54 are carried in generally horizontally extending slots 56 formed in the side and centrally disposed elements of the bottom member 16 for movement between the extremities illustrated in FIGS. 4 and 5. Movement of the rods 54 to the outer extremity illustrated in FIG. 4 functions to lower the lower jaws 32 and movement of the rods to the inner extremity, as illustrated in FIG. 5, functions to raise the lower jaws 32. The purpose of thus raising and lowering the lower jaws is to adjust the distance between the upper and lower jaws so that the apparatus may accommodate tires of different diameters.

OPERATION

In operation, the apparatus is first adjusted to accommodate the size of tire being handled. Typically, the apparatus is designed to accommodate tires of two diameters, with the larger position of adjustment provided by moving the rods 54 to the outermost ends of the slots 56, and the smallest position of adjustment provided by moving the rods 54 to the innermost extremity of the slots 56. As an example of the sizes of tires which the apparatus may be so adjusted to accommodate, the smallest position of adjustment might accommodate a 20 inches tire and the largest position of adjustment a 22 inches tire.

The straps 48 may also be adjusted to accommodate tires of different diameters and this adjustment is generally made at the same time that the position of the lower jaws 32 is adjusted through means of the stop rods 54. The purpose of adjusting the lengths of the straps 48 is simply to limit the extent to which the upper jaws 30 may be compressed in response to expansion of the air bags 42. The solid line representation of the upper jaw 30 in FIG. 4 illustrates the maximum degree to which the jaw may be compressed when the apparatus is adjusted to take a larger size tire (e.g., 22 inches). The innermost phantom line representation of the jaw 30 in FIG. 4 illustrates the position of maximum compression of the jaw 30 when the apparatus is adjusted to take a tire of small diameter (e.g., 20 inches). The uppermost phantom line representation of the jaw 30 in FIG. 4 illustrates the position of the jaw when it is fully retracted to facilitate the entry of a tire into the space between the upper and lower jaws. In the latter condition, the mouth defined between the leading extremities of the upper and lower jaws has a vertical dimension greater than the outside diameter of the tire being handled.

Once the apparatus is adjusted to accommodate the size of tire being handled, the air is exhausted from the air bags 42 to permit the upper jaws to move to the uppermost phantom line position illustrated in FIG. 4. Movement to this position is facilitated through means of the leaf springs 40 interconnecting the upper and lower jaws. These springs normally bias the upper and lower jaws apart and toward the fully open condition.

With the apparatus adjusted and the jaws in the fully opened condition, tires to be processed are rolled between the jaws through the open mouth defined by their leading edges. Once rolled into the apparatus, the tires assume a condition supported on the lower jaws and held upright between the side members 28. One tire so positioned is illustrated to the lefthand side of FIG. 1.

The ramps 52 provide for direct rolling of tires into the space between the jaws without the necessity of physically lifting the tires. It is noted that the ramps 52 extend between the leading edges of the lower jaws 32 and the surface on which the apparatus 10 is supported. The ramps 52 are of sufficient length so that the inclination thereof is relatively mild. The pivotal connection of the ramps to the lower jaws 32 provides for automatic adjustment of the ramps as the position of the lower jaws is adjusted in response to movement of the stop rods 54.

Once the tires are rolled into place between the upper and lower jaws, they may be rotated to position the valve stems thereon at convenient locations. Rotation may be manually effected with ease as a result of the rollable support of the tires by the rollers 50.

After the valve stems of the tires are positioned as desired, air supply hoses are connected to the stems and the upper jaws 30 are compressed through expansion of the air bags 42. Preferably, the air bags 42 are simultaneously expanded through means of a common air supply source having lines leading to the bags with valve and pressure regulator means interposed therein. A typical setting for the regulator means would be 80 psi.

Compression of the jaws 30 through means of the air bags 42 functions to squeeze the tires received between the jaws and force the beads thereof against the rims of the wheels on which the tires are mounted. Once the beads are so forced against the rims, the tires are inflated by supplying air to the lines leading to the valve stems of the tires. This functions to inflate the tires and fully seat the beads on the wheel rims. The inflation lines leading to the valve stems of the tires may be controlled by a common valve and provided with a regulator so that the tires will be automatically inflated to a desired degree.

Once the beads of the tires are fully seated, the air pressure in the air bags 42 is released so that the tires may expand to the fully inflated condition. On assuming the latter condition, the operation of the apparatus is complete and the tires may be removed therefrom. The removal operation simply amounts to rolling the tires out from between the open jaws.

Although not illustrated, it should be understood that the inflation circuitry for the air bags 42 and the air lines leading to the valve stems of the tires may be incorporated directly into the apparatus. Typically, the air lines leading to the valve stems would be flexible and provided with quick-disconnect couplers. The valves would be of the palm operated type with regulators incorporated thereinto. In the preferred arrangement, a separate valve might be provided for each pair of aligned upper and lower jaws in order that one pair might be actuated independently of the other.

CONCLUSION

Although a single embodiment has been illustrated, it should be understood that the invention is not intended to be limited to that embodiment, but rather is defined by the following claims. For example, it is anticipated that the number of stations within the apparatus may be varied to accommodate more than two tires, or a single tire.

What is claimed is:

1. An apparatus for seating the beads on tubeless tires, said apparatus comprising: an upright framework; a lower jaw supported by said framework in a generally vertical plane and having a leading edge disposed proximate the lower forward extremity of the apparatus; an upper jaw supported by said framework above and in opposed facing relationship to the lower jaw, said upper jaw being vertically aligned with the lower jaw and said upper and lower jaws being conformed for engagement with the periphery of a tire received therebetween, said upper jaw having a leading edge disposed above and in spaced relationship to the leading edge of the lower jaw; means mounting at least one of the jaws for movement toward and away from the other, said at least one jaw being rigid and movable between an expanded condition wherein the leading edges of the jaws are vertically spaced from one another by a distance greater than the outside diameter of a tire to be treated by the apparatus to provide a vertically extensive laterally open unobstructed mouth through which such a tire may be rolled and a compressed condition wherein the jaws engage the periphery of a tire received therebetween; compression imparting means to selectively move said at least one of the jaws toward the other to forcibly engage the jaws with the periphery of a tire received therebetween; and means on the framework to maintain a tire received between the jaws in an upright position.

2. An apparatus, according to claim 1, further comprising means to normally bias the jaws away from one another and toward the expanded condition.

3. An apparatus, according to claim 2, wherein each jaw comprises a rigid member and the means to normally bias the jaws away from one another comprises a leaf spring secured to the respective jaws and extending therebetween.

4. An apparatus for seating the beads on tubeless tires, said apparatus comprising: a lower jaw disposed in a generally vertical plane and having a leading edge disposed proximate the forward extremity of the apparatus; an upper jaw disposed above and in opposed facing relationship to the lower jaw, said upper jaw being vertically aligned with the lower jaw and said upper and lower jaws being conformed for engagement with the periphery of a tire received therebetween; said upper jaw having a leading edge disposed above and in spaced relationship to the leading edge of the lower jaw whereby the leading edges of the respective jaws define a mouth therebetween through which a tire may be rolled into the spaced between the jaws; means for mounting at least one of the jaws for movement toward and away from the other between an expanded condition wherein a tire may be rolled through the mouth defined by the leading edges of the jaws and a compressed condition wherein the jaws engage the periphery of a tire received therebetween; compression imparting means to selectively move at least one of the jaws toward the other to forcibly engage the jaws with the periphery of a tire received therebetween; means to maintain a tire received between the jaws in an upright position and rollers mounted on the lower jaw to extend inwardly therefrom for rollable engagement with the lower surface of a tire received between the jaws.

5. An apparatus for seating the beads on tubeless tires, said apparatus comprising: a rigid framework; a lower jaw mounted within the framework in a generally vertical plane and having a leading edge disposed proximate the forward extremity of the apparatus; an upper jaw mounted within the framework and disposed above and in opposed facing relationship to the lower jaw, said upper jaw being vertically aligned with the lower jaw and said upper and lower jaws being conformed for engagement with the periphery of a tire received therebetween, said upper jaw having a leading edge disposed above and in spaced relationship to the leading edge of the lower jaw whereby the leading edges of the respective jaws define a mouth therebetween through which a tire may be rolled into the space between the jaws, means for mounting at least one of the jaws for movement relative to the framework toward and away from the other jaw between an expanded condition wherein a tire may be rolled through the mouth defined by the leading edges of the jaws and a compressed condition wherein the jaws engage the periphery of a tire received therebetween; a selectively expansible air bag disposed between the framework and the jaw mounted for movement toward and away from the other jaw to selectively move said at least one of the jaws toward the other to forcibly engage the jaws with the periphery of a tire received therebetween; and means to maintain a tire received between the jaws in an upright position.

6. An apparatus for seating the beads on tubless tires, said apparatus comprising: a rigid framework; a lower jaw mounted within the framework in a generally vertical plane and having a leading edge disposed proximate the forward extremity of the apparatus; an upper jaw mounted within the framework and disposed above and in opposed facing relationship to the lower jaw, said upper jaw being vertically aligned with the lower jaw and said upper and lower jaws being conformed for engagement with the periphery of a tire received therebetween, said upper jaw having a leading edge disposed above and in spaced relationship to the leading edge of the lower jaw whereby the leading edges of the respective jaws define a mouth therebetween through which a tire may be rolled into the space between the jaws; means mounting both of the jaws for movement relative to the framework and toward and away from one another, said upper jaw being movable between an expanded condition wherein a tire may be rolled through the mouth defined by the leading edges of the jaws and a compressed condition wherein the jaws engage the periphery of a tire received therebetween, said lower jaw being movable to accommodate tires of different diameters; a selectively expansible member mounted between the framework and the upper jaw whereby expansion of said member functions to force the upper jaw toward the lower jaw to forcibly engage the jaws with the periphery of a tire received therebetween; means for selectively adjusting the elevation of the lower jaw relative to the upper jaw to accommodate tires of different diameters, and means to maintain a tire received between the jaws in an upright position.

7. An apparatus, according to claim 6, wherein the means provided to mount the jaws for movement relative to the framework comprises a pivotal connection securing the lower jaw to the framework and a leaf spring connection resiliently securing the upper jaw to the lower jaw.

8. An apparatus, according to claim 6, further comprising a ramp pivotally secured to the leading edge of the lower jaw for extension between said edge and a surface upon which the framework is supported.

9. An apparatus for simultaneously seating the beads on a pair of tubeless tires, said apparatus comprising: an upright framework; a pair of lower jaws supported by said framework, said jaws being disposed, respectively, in generally side-by-side vertical planes, each of said jaws having a leading edge disposed proximate the forward extremity of the apparatus; a pair of upper jaws supported by said framework, said jaws being disposed, respectively, in opposed vertically aligned relationship to the lower jaws whereby two pairs of vertically aligned jaws are provided, said aligned upper and lower jaws being conformed for engagement with the periphery of a tire received therebetween and said upper jaws having leading edges disposed, respectively, above the leading edges of the lower jaws aligned therewith to define a vertically extensive mouth through which a tire may be rolled into the space between the aligned jaws; means mounting at least one jaw of each pair of vertically aligned jaws for movement relative to the other jaw of the pair, said at least one jaw of each pair of vertically aligned jaws being rigid and movable between an expanded condition wherein a tire may be rolled through the mouth defined by the leading edges of the vertically aligned jaws and a compressed condition wherein the vertically aligned jaws engage the periphery of a tire received therebetween; means for selectively imparting relative movement to said at least one jaw of each pair of vertically aligned jaws to move said at least one jaw of each pair of vertically aligned jaws between the expanded and compressed conditions; and, means on the framework to maintain a tire received between the aligned jaws in an upright generally vertically disposed position.

* * * * *